United States Patent
Keith, Jr.

(10) Patent No.: US 8,335,779 B2
(45) Date of Patent: Dec. 18, 2012

(54) METHOD AND APPARATUS FOR GATHERING, CATEGORIZING AND PARAMETERIZING DATA

(75) Inventor: Robert Olan Keith, Jr., Modesto, CA (US)

(73) Assignee: Gamroe Applications, LLC, Dover, DE (US)

( * ) Notice: Subject to any disclaimer, the term of this patent is extended or adjusted under 35 U.S.C. 154(b) by 0 days.

(21) Appl. No.: 13/103,762

(22) Filed: May 9, 2011

(65) Prior Publication Data

US 2011/0213783 A1    Sep. 1, 2011

Related U.S. Application Data (63) Continuation of application No. 10/638,088, filed on Aug. 7, 2003, now abandoned.

(60) Provisional application No. 60/403,920, filed on Aug. 16, 2002.

(51) Int. Cl.
*G06F 17/30* (2006.01)
(52) U.S. Cl. ......... 707/710; 707/709; 707/705; 707/711
(58) Field of Classification Search .................. 707/705, 707/709, 710, 711
See application file for complete search history.

(56) References Cited

U.S. PATENT DOCUMENTS

| | | | |
|---|---|---|---|
| 3,678,461 A | 7/1972 | Choate et al. |
| 3,715,730 A | 2/1973 | Smith et al. |
| 3,716,840 A | 2/1973 | Masten et al. |
| 4,905,163 A | 2/1990 | Garber et al. |
| 4,991,135 A | 2/1991 | Yoshimura et al. |
| 5,089,952 A | 2/1992 | Bozman |
| 5,121,493 A | 6/1992 | Ferguson |
| 5,123,084 A | 6/1992 | Prevost et al. |
| 5,222,234 A | 6/1993 | Wang et al. |
| 5,404,512 A | 4/1995 | Powers et al. |
| 5,442,784 A | 8/1995 | Powers et al. |
| 5,535,132 A | 7/1996 | Fujita et al. |
| 5,537,592 A | 7/1996 | King et al. |
| 5,544,360 A | 8/1996 | Lewak et al. |
| 5,590,284 A | 12/1996 | Crosetto |
| 5,604,772 A | 2/1997 | Botto et al. |
| 5,613,110 A | 3/1997 | Stuart |

(Continued)

FOREIGN PATENT DOCUMENTS

JP   02001034619   2/2001

(Continued)

OTHER PUBLICATIONS

Website collection from www.thewebaccess.com, collectively dated from May 31, 2002.*

(Continued)

*Primary Examiner* — Mahesh Dwivedi
(74) *Attorney, Agent, or Firm* — Woodcock Washburn LLP (57) ABSTRACT

An apparatus for and a method of gathering new data form a specific data source, categorizing this data into a hierarchical directory structure, and building parameters to further describe this data. A harvesting system is an application that can organize and locate external data; the harvesting system can be used to navigate, organize and locate this data. The harvesting system utilizes a defined data model, referred to as a core data structure, that describes the logical structure of the data. Within the core data structure are pointers, which refer back to the source data. The loading process can be manually done, or can be automatically accomplished using this harvesting process.

25 Claims, 5 Drawing Sheets

U.S. PATENT DOCUMENTS

| | | | |
|---|---|---|---|
| 5,664,172 A | 9/1997 | Antoshenkov | |
| 5,696,962 A | 12/1997 | Kupiec | |
| 5,701,467 A | 12/1997 | Freeston | |
| 5,761,655 A | 6/1998 | Hoffman | |
| 5,778,367 A | 7/1998 | Wesinger, Jr. et al. | |
| 5,781,431 A | 7/1998 | Duret et al. | |
| 5,781,773 A | 7/1998 | Vanderpool et al. | |
| 5,781,906 A | 7/1998 | Aggarwal et al. | |
| 5,787,274 A | 7/1998 | Aggarwal et al. | |
| 5,799,184 A | 8/1998 | Fulton et al. | |
| 5,802,508 A | 9/1998 | Morgenstern | |
| 5,838,965 A | 11/1998 | Kavanagh et al. | |
| 5,873,080 A | 2/1999 | Coden et al. | |
| 5,884,301 A | 3/1999 | Takano | |
| 5,924,090 A | 7/1999 | Krellenstein | |
| 5,974,409 A | 10/1999 | Sanu et al. | |
| 5,987,446 A | 11/1999 | Corey et al. | |
| 5,991,756 A | 11/1999 | Wu | |
| 5,992,737 A | 11/1999 | Kubota | |
| 6,009,422 A | 12/1999 | Ciccarelli | |
| 6,014,639 A | 1/2000 | Fohn et al. | |
| 6,018,708 A | 1/2000 | Dahan et al. | |
| 6,035,423 A | 3/2000 | Hodges et al. | |
| 6,049,809 A | 4/2000 | Raman et al. | |
| 6,067,552 A | 5/2000 | Yu | |
| 6,072,490 A | 6/2000 | Bates et al. | |
| 6,073,135 A | 6/2000 | Broder et al. | |
| 6,078,866 A * | 6/2000 | Buck et al. | 702/2 |
| 6,078,913 A | 6/2000 | Aoki et al. | |
| 6,078,914 A | 6/2000 | Redfern | |
| 6,094,294 A | 7/2000 | Yokoyama et al. | |
| 6,094,548 A | 7/2000 | Gunning et al. | |
| 6,094,652 A | 7/2000 | Faisal | |
| 6,098,066 A | 8/2000 | Snow et al. | |
| 6,112,203 A | 8/2000 | Bharat et al. | |
| 6,133,938 A | 10/2000 | James | |
| 6,138,123 A | 10/2000 | Rathbun | |
| 6,169,992 B1 | 1/2001 | Beall et al. | |
| 6,175,835 B1 | 1/2001 | Shadmon | |
| 6,185,550 B1 | 2/2001 | Snow et al. | |
| 6,185,552 B1 | 2/2001 | DeLong et al. | |
| 6,185,569 B1 | 2/2001 | East et al. | |
| 6,195,652 B1 | 2/2001 | Fish | |
| 6,208,993 B1 | 3/2001 | Shadmon | |
| 6,212,518 B1 | 4/2001 | Yoshida et al. | |
| 6,226,641 B1 | 5/2001 | Hickson et al. | |
| 6,253,188 B1 | 6/2001 | Witek et al. | |
| 6,256,623 B1 | 7/2001 | Jones | |
| 6,292,796 B1 | 9/2001 | Drucker et al. | |
| 6,292,894 B1 | 9/2001 | Chipman et al. | |
| 6,321,224 B1 | 11/2001 | Beall et al. | |
| 6,327,588 B1 | 12/2001 | Danish et al. | |
| 6,339,767 B1 | 1/2002 | Rivette et al. | |
| 6,341,280 B1 | 1/2002 | Glass et al. | |
| 6,349,307 B1 | 2/2002 | Chen | |
| 6,360,227 B1 | 3/2002 | Aggarwal et al. | |
| 6,381,607 B1 | 4/2002 | Wu et al. | |
| 6,389,409 B1 | 5/2002 | Horovitz et al. | |
| 6,393,427 B1 * | 5/2002 | Vu et al. | 707/797 |
| 6,415,279 B1 | 7/2002 | Gard et al. | |
| 6,418,433 B1 * | 7/2002 | Chakrabarti et al. | 1/1 |
| 6,421,661 B1 | 7/2002 | Doan et al. | |
| 6,421,675 B1 | 7/2002 | Ryan et al. | |
| 6,424,966 B1 * | 7/2002 | Meyerzon et al. | 707/610 |
| 6,480,835 B1 | 11/2002 | Light | |
| 6,484,165 B1 | 11/2002 | Beall et al. | |
| 6,499,033 B1 | 12/2002 | Vagnozzi | |
| 6,513,032 B1 | 1/2003 | Sutter | |
| 6,516,337 B1 * | 2/2003 | Tripp et al. | 709/202 |
| 6,523,021 B1 | 2/2003 | Monberg et al. | |
| 6,523,961 B2 | 2/2003 | Ilkov et al. | |
| 6,532,097 B1 | 3/2003 | Allen et al. | |
| 6,542,593 B1 * | 4/2003 | Bowman-Amuah | 379/201.03 |
| 6,553,364 B1 | 4/2003 | Wu | |
| 6,567,800 B1 | 5/2003 | Barrera et al. | |
| 6,584,471 B1 | 6/2003 | Maclin et al. | |
| 6,622,170 B1 | 9/2003 | Harrison et al. | |
| 6,625,609 B1 | 9/2003 | McDade et al. | |
| 6,631,367 B2 | 10/2003 | Teng et al. | |
| 6,631,496 B1 * | 10/2003 | Li et al. | 715/200 |
| 6,675,161 B1 | 1/2004 | Suchter | |
| 6,675,178 B1 | 1/2004 | Chinchar et al. | |
| 6,691,108 B2 * | 2/2004 | Li | 707/710 |
| 6,704,729 B1 | 3/2004 | Klein et al. | |
| 6,735,585 B1 | 5/2004 | Black et al. | |
| 6,748,374 B1 | 6/2004 | Madan et al. | |
| 6,760,721 B1 | 7/2004 | Chasen et al. | |
| 6,760,735 B1 | 7/2004 | Rusche | |
| 6,772,139 B1 | 8/2004 | Smith, III | |
| 6,826,597 B1 * | 11/2004 | Lonnroth et al. | 709/207 |
| 6,832,206 B1 | 12/2004 | Chelnik | |
| 6,836,768 B1 * | 12/2004 | Hirsch | 715/225 |
| 6,847,972 B1 | 1/2005 | Vernau et al. | |
| 6,882,995 B2 | 4/2005 | Nasr et al. | |
| 6,901,433 B2 | 5/2005 | San Andres et al. | |
| 6,941,317 B1 | 9/2005 | Chamberlin et al. | |
| 7,003,514 B2 | 2/2006 | Dutta et al. | |
| 7,054,875 B2 | 5/2006 | Keith, Jr. | |
| 7,080,073 B1 * | 7/2006 | Jiang et al. | 1/1 |
| 7,085,736 B2 * | 8/2006 | Keezer et al. | 705/27.1 |
| 7,085,766 B2 | 8/2006 | Keith, Jr. | |
| 7,130,847 B2 | 10/2006 | Waters et al. | |
| 7,130,861 B2 * | 10/2006 | Bookman et al. | 1/1 |
| 7,213,024 B2 | 5/2007 | Keith, Jr. | |
| 7,243,267 B2 | 7/2007 | Klemm et al. | |
| 7,249,319 B1 | 7/2007 | Payne et al. | |
| 7,257,588 B2 | 8/2007 | Keith, Jr. | |
| 7,260,579 B2 | 8/2007 | Keith, Jr. | |
| 7,305,399 B2 | 12/2007 | Keith, Jr. | |
| 7,305,400 B2 | 12/2007 | Keith, Jr. | |
| 7,305,401 B2 | 12/2007 | Keith, Jr. | |
| 7,395,282 B1 | 7/2008 | Crescenti et al. | |
| 7,469,254 B2 | 12/2008 | Keith, Jr. | |
| 7,672,963 B2 | 3/2010 | Keith, Jr. | |
| 7,747,654 B2 | 6/2010 | Keith, Jr. | |
| 7,756,850 B2 | 7/2010 | Keith, Jr. | |
| 2001/0025304 A1 | 9/2001 | Keith, Jr. | |
| 2001/0042104 A1 | 11/2001 | Donoho et al. | |
| 2001/0044837 A1 | 11/2001 | Talib et al. | |
| 2001/0047430 A1 | 11/2001 | Dev et al. | |
| 2001/0056460 A1 * | 12/2001 | Sahota et al. | 709/201 |
| 2002/0010647 A1 | 1/2002 | Kim | |
| 2002/0016793 A1 | 2/2002 | Keith, Jr. | |
| 2002/0016794 A1 | 2/2002 | Keith, Jr. | |
| 2002/0016959 A1 | 2/2002 | Barton et al. | |
| 2002/0023085 A1 | 2/2002 | Keith, Jr. | |
| 2002/0032672 A1 | 3/2002 | Keith, Jr. | |
| 2002/0038348 A1 | 3/2002 | Malone et al. | |
| 2002/0046232 A1 | 4/2002 | Adams et al. | |
| 2002/0065812 A1 | 5/2002 | Keith, Jr. | |
| 2002/0069367 A1 | 6/2002 | Tindal et al. | |
| 2002/0073204 A1 | 6/2002 | Dutta et al. | |
| 2002/0091686 A1 | 7/2002 | Keith, Jr. | |
| 2002/0124082 A1 | 9/2002 | San Andres et al. | |
| 2002/0133686 A1 | 9/2002 | Tamatsu | |
| 2002/0138487 A1 * | 9/2002 | Weiss et al. | 707/10 |
| 2002/0143984 A1 | 10/2002 | Hudson Michel | |
| 2002/0144252 A1 | 10/2002 | Straube et al. | |
| 2002/0194161 A1 * | 12/2002 | McNamee et al. | 707/2 |
| 2003/0018712 A1 | 1/2003 | Harrow et al. | |
| 2003/0050815 A1 | 3/2003 | Seigel et al. | |
| 2003/0050834 A1 | 3/2003 | Caplan | |
| 2003/0055892 A1 | 3/2003 | Huitema et al. | |
| 2003/0058864 A1 | 3/2003 | Michels et al. | |
| 2003/0074400 A1 * | 4/2003 | Brooks et al. | 709/203 |
| 2003/0088571 A1 | 5/2003 | Ekkel | |
| 2003/0097381 A1 | 5/2003 | Detweiler et al. | |
| 2003/0120724 A1 | 6/2003 | Kawashimo et al. | |
| 2003/0126199 A1 | 7/2003 | Kadri et al. | |
| 2003/0195999 A1 | 10/2003 | Hetrick | |
| 2003/0204578 A1 | 10/2003 | Yip et al. | |
| 2004/0123144 A1 | 6/2004 | Chan et al. | |
| 2004/0148155 A1 | 7/2004 | Vogel | |
| 2005/0102382 A1 | 5/2005 | MacGregor et al. | |
| 2005/0165766 A1 | 7/2005 | Szabo | |
| 2006/0173873 A1 | 8/2006 | Prompt et al. | |

| | | | |
|---|---|---|---|
| 2006/0265364 | A1 | 11/2006 | Keith, Jr. |
| 2006/0288023 | A1 | 12/2006 | Szabo |
| 2010/0241662 | A1 | 9/2010 | Keith, Jr. |

FOREIGN PATENT DOCUMENTS

| | | |
|---|---|---|
| WO | WO 01/67207 | 9/2001 |
| WO | WO 01/67209 | 9/2001 |
| WO | WO 01/67351 | 9/2001 |

OTHER PUBLICATIONS

U.S. Appl. No. 60/403,920, filed Aug. 16, 2001, Keith, Jr.
U.S. Appl. No. 10/638,095, filed Aug. 7, 2003, Keith, Jr.
U.S. Appl. No. 10/637,734, filed Aug. 7, 2003, Keith, Jr.
"Get Paid to Surf the Web", http://web.archive.org/web/20010405173411/www.thewebaccess.com/submit.hml, dated Apr. 5, 2001, 7 pages.
"Blue Martini Customer Interactive System," printed from www.bluemartini.com website on Nov. 22, 2000, 4 pages.
"Quiver: Community-Powered Search Solutions," printed from www.quiver.com website on Nov. 22, 2000, 9 pages.
Chekuri et al., "Web Search Using Automatic Classification", Proceedings of the Sixth International World Wide Web Conference, Apr. 7-11, 1997, 11 pages, Computer Science Department, Stanford University.
Collective Internet web pages from www.thewebaccess.com, retrieved on May 31, 2001 from internet archive.
Final Office Action for U.S. Appl. No. 11/492,407, mailed on Jul. 20, 2009, 1-52.
Edozien, J., "eBusiness is Enterprise Application Integration," Arthur Anderson eBusiness Solutions, Jan. 2000, 1-15.
Fanucci et al., "High-Throughput, Low Complexity, Parametrizable VLSI Architecture for Full Search Block Matching Algorithm for Advanced Multimedia Applications,"—Electronics, circuits and systems, 1999, Proceedings of ICECS '99, vol. 3, Sep. 5-8, 1999, 1479-1482.
Glushko et al., "Hypertext Engineering": Practical Methods for Creating a Compact Disc Encyclopedia, ACM, Dec. 5, 1988, 11-19.
Glushko, Robert J., "Transforming Text Into Hypertext for a Compact Disc Encyclopedia," ACM May 1989, CHI'89 Proceedings, 293-298.
Goodman, A., "Quiver: Inktomi on Steroids?," www.traffick.com website, Jul. 2000, 1-3.
Jacobson, et al., "Focusing Search in Hierarchical Structures with Directory Sets", Proceedings of the Seventh International Conference on Information and Knowledge Management, 1998, 1-9.
Liao, Andrew M., "Self-adjusting Data Structures: Use Self-adjusting Heuristics to Improve the Performance of your Applications", Dr. Dobb's Journal, Feb. 1990, 15(2), 1-9.
Rathore, et al., "Adaptive searching and replication of images in mobile hierarchical peer-to-peer networks," Data & Knowledge Engineering, Jun. 9, 2007, 63(3), 894-918.
Seeley, R., "Twenty Questions for Saga Software's Andre Yee," eAI Journal, Nov./Dec. 2000, 54-56.
U.S. Appl. No. 10/638,088, filed Aug. 7, 2003, Keith, Jr.
U.S. Appl. No. 13/401,599, filed Feb. 21, 2012, Keith, Jr.
International Patent Application No. PCT/US2001/07096: International Search Report dated Jun. 22, 2001, 2 pages.
International Patent Application No. PCT/US2001/07112: International Search Report dated Jan. 11, 2002, 3 pages.
International Patent Application No. PCT/US2001/07185: International Search Report dated Aug. 27, 2001, 3 pages.

* cited by examiner

METHOD AND APPARATUS FOR GATHERING, CATEGORIZING AND PARAMETERIZING DATA

CROSS-REFERENCE TO RELATED APPLICATIONS

This application is a continuation of U.S. patent application Ser. No. 10/638,088 filed Aug. 7, 2003, which claims the benefit under 35 U.S.C. §119(e) of U.S. Provisional Application Ser. No. 60/403,920 filed Aug. 16, 2002 now expired. Each of which is hereby incorporated by reference in its entirety.

The following co-owned, co-filed, co-pending U.S. patent application Ser. No. 10/638,095 filed Aug. 7, 2003 and Ser. No. 10/637,734 filed Aug. 7, 2003 are also incorporated by reference.

TECHNICAL FIELD

This invention relates to a method of organizing data within a searchable database. More particularly, the invention relates to a method of gathering, categorizing, and parameterizing data for inclusion within a searchable database.

BACKGROUND

As documents move from a paper format to an electronic format, the compilation and subsequent retrieval of the ever-increasing number of electronic documents becomes increasingly complex. Distribution of electronic documents over the Internet and an increasing number of distributed corporate intranets only increases the level of complexity. Finding and categorizing electronic documents scattered about such a distributed environment becomes increasing important as knowledge continues to migrate into the electronic world.

Many search systems have attempted to analyze electronic documents for the purpose of categorizing and intelligently describing the document for later retrieval. These systems have had limited success to date. The process of reading an electronic document and conceptualizing the contents into categories and such is a daunting technical challenge.

It would therefore be advantageous to provide a system for and a method of locating electronic documents stored within a distributed environment, categorizing the located electronic documents according to their content, and indexing the categorized electronic documents for easier retrieval.

SUMMARY

A harvesting system the present invention automatically gathering new data from a specified data source, categorizing this data into a hierarchical directory structure, and building parameters to further describe this data. The harvesting system utilizes a defined data model, referred to as a core data structure, that describes the logical structure of the data. Data can be harvested from a plurality of data sources. Preferably, each data source is a known data source, that is a format of the data is known and defined by the harvesting system. In this manner, a set of rules can be defined to enable the harvesting system to parse and interpret this data into categories, parameters, etc.

In one aspect of the present invention, a method of linking data to a searchable database includes locating data to link to the searchable database, and categorizing the located data according to a rules repository, thereby linking the located data to one or more nodes within a core data structure of the searchable database, wherein the rules repository is a compilation of rules defined from the nodes of the core data structure. Each node linked to the located data can include a pointer that references the location of the located data. The method can also include parsing the located data for parameters. Each parameter can define an attribute-value pair. The method can also include queuing the located data to be manually reviewed before associating the located data to the one or more nodes. Locating data, categorizing the located data and associating the located data to the one or more nodes can be performed automatically. The method can also include determining if the located data is new data related to the searchable database prior to categorizing the located data. The located data can be from a known data source. The known data source can format data according to a known format, and the located data can be categorized by recognizing the known format and using rules from the rules repository that are associated with the known format.

In another aspect of the present invention, a method of linking data to a searchable database includes locating data to link to the searchable database, matching the located data to one of a set of templates, and categorizing the located data according to the matching template, thereby linking the located data to one or more nodes within a core data structure of the searchable database. Each template can define a set of rules for linking matched located data to one or more nodes within the core data structure. Each template can define a known data format. Matching the located data to one of the templates can be performed by comparing a data format of the located data to a data format associated with each template. Matching the located data to one of the templates can be performed by comparing a file type of the located data to a file type associated with each template. The method can also include parsing the located data for parameters, wherein each parameter defines at least an attribute-value pair. Each template can define a set of anticipated attributes which are used as a basis for discovering attribute-value pairs within the located data. Parsing the located data for parameters can comprise comparing the located data against an attributes repository, wherein the attributes repository is a compilation of attributes defined within the nodes of the core data structure, and generating a list of attribute-value pairs corresponding to the located data, at least one attribute-value pair for each attribute from the attribute repository that is found within the located data. The method can also include determining if the located data is linked to one or more additional nodes by matching the list of attribute-value pairs corresponding to the located data to a set of rules for each node within the core data structure. Each matched template can include a set of rules that links the located data to one or more nodes within the core data structure. The method can also include determining if the located data is new data related to the searchable database prior to categorizing the located data. The method can also include queuing the located data to be manually reviewed before linking the located data to the one or more nodes. Locating data, categorizing the located data and linking the located data to the one or more nodes can be performed automatically.

In yet another aspect of the present invention, a method of linking data to a searchable database includes locating data to link to the searchable database, parsing the located data for parameters, wherein each parameter defines at least an attribute-value pair, and linking the located data to one or more nodes within a core data structure of the searchable database by cascading through the core data structure and matching a list of attribute-value pairs corresponding to the located data to a set of rules for each node within the core data structure. Parsing the located data for parameters can comprise comparing the located data against an attributes repository, wherein the attributes repository is a compilation of attributes defined within the nodes of the core data structure, and generating the list of attribute-value pairs corresponding to the located data, at least one attribute-value pair for each attribute from the attribute repository that is found within the located data.

In still yet another aspect of the present invention, a data harvesting system for linking data to a searchable database includes means for locating data to link to the searchable database, means for matching the located data to one of a set of templates, and means for categorizing the located data according to the matching template, thereby linking the located data to one or more nodes within a core data structure of the searchable database. Each template can define a set of rules for linking matched located data to one or more nodes within the core data structure. Each template can define a known data format. The means for matching the located data to one of the templates can include means for comparing a data format of the located data to a data format associated with each template. The means for matching the located data to one of the templates can include means for comparing a file type of the located data to a file type associated with each template. The system can also include means for parsing the located data for parameters, wherein each parameter defines at least an attribute-value pair. Each template can define a set of anticipated attributes which are used as a basis for discovering attribute-value pairs within the located data. The means for parsing the located data for parameters can comprise means for comparing the located data against an attributes repository, wherein the attributes repository is a compilation of attributes defined within the nodes of the core data structure, and means for generating a list of attribute-value pairs corresponding to the located data, at least one attribute-value pair for each attribute from the attribute repository that is found within the located data.

The system can also include means for determining if the located data is linked to one or more additional nodes including means for matching the list of attribute-value pairs corresponding to the located data to a set of rules for each node within the core data structure. Each matched template can include a set of rules that links the located data to one or more nodes within the core data structure. The system can also include means for determining if the located data is new data related to the searchable database prior to categorizing the located data. The system can also include means for queuing the located data to be manually reviewed before linking the located data to tile one or more nodes.

In another aspect of the present invention, a data harvesting apparatus for linking data to a searchable database includes a first database for storing a set of templates and a core data structure corresponding to the searchable database, and a controller coupled to the first database such that in operation the controller locates data to link to the searchable database, matches the located data to one of the set of templates, and categorizes the located data according to the matching template, thereby linking the located data to one or more nodes within a core data structure of the searchable database. The first database can be a distributed database. Each template can define a set of rules for linking matched located data to one or more nodes within the core data structure. Each template can define a known data format. The controller can match the located data to one of the templates by comparing a data format of the located data to a data format associated with each template. The controller can match the located data to one of the templates by comparing a file type of the located data to a file type associated with each template. The controller can parse the located data for parameters, wherein each defines at least an attribute-value pair. Each template can define a set of anticipated attributes which are used as a basis for discovering attribute-value pairs within the located data. The first database can include an attributes repository which is a compilation of attributes defined within the nodes of the core data structure, such that in operation the controller compares the located data against the attributes repository and generates a list of attribute-value pairs corresponding to the located data, at least one attribute-value pair for each attribute from the attribute repository that is found within the located data. The controller can determine if the located data is linked to one or more additional nodes by matching the list of attribute-value pairs corresponding to the located data to a set of rules for each node within the core data structure. Each matched template can include a set of rules that links the located data to one or more nodes within the core data structure. The controller can determine if the located data is new data related to the searchable database prior to categorizing the located data. The controller can queue the located data to be manually reviewed before linking the located data to the one or more nodes.

In yet another aspect of the present invention, a data harvesting system for linking data to a searchable database includes a network of devices, each device including at least one data source, and a data harvesting apparatus comprising a first database for storing a set of templates and a core data structure corresponding to the searchable database, and a controller coupled to the first database such that in operation the controller locates data to link to the searchable database, matches the located data to one of the set of templates, and categorizes the located data according to the matching template, thereby linking the located data to one or more nodes within a core data structure of the searchable database. The first database can be a distributed database. Each template can define a set of rules for linking matched located data to one or more nodes within the core data structure. Each template can define a known format. The controller can match the located data to one of the templates by comparing a data format of the located data to a data format associated with each template. The controller can match the located data to one of the templates by comparing a file type of the located data to a file type associated with each template. The controller can parse the located data for parameters, wherein each parameter defines at least an attribute-value pair. Each template can define a set of anticipated attributes which are used as a basis for discovering attribute-value pairs within the located data. The first database can include an attributes repository which is a compilation of attributes defined within the nodes of the core data structure, such that in operation the controller compares the located data against the attributes repository and generates a list of attribute-value pairs corresponding to the located data, at least one attribute-value pair for each attribute from the attribute repository that is found within the located data. The controller can determine if the located data is linked to one or more additional nodes by matching the list of attribute-value pairs corresponding to the located data to a set of rules for each node within the core data structure. Each matched template can include a set of rules that links the located data to one or more nodes within the core data structure. The controller can determine if the located data is new data related to the searchable database prior to categorizing the located data. The controller can queue the located data to be manually reviewed before linking the located data to the one or more nodes.

DETAILED DESCRIPTION OF ILLUSTRATIVE EMBODIMENTS

Embodiments of the present invention provide an apparatus for and a method of automatically gathering new data from a specified data source, categorizing this data into a hierarchical directory structure, and building parameters to further describe this data. A harvesting system of the present invention is an application that can organize and locate external data; the harvesting system can be used to navigate, organize and locate this data. The harvesting system utilizes a defined data model, referred to as a core data structure, that describes the logical structure of the data. Within the core data structure are pointers, which refer back to the source data. The loading process can be manually done, or can be automatically accomplished using this harvesting process.

Data can be harvested from a plurality of data sources. Preferably, each data source is a known data source, that is a format of the data is known and defined by the harvesting system. In this manner, a set of rules can be defined to enable the harvesting system to parse and interpret this data into categories, parameters, etc.

The core data structure is preferably a directory tree structure that overlays and points to existing data thereby providing the necessary management and access processes relative to the existing data. The directory tree structure preferably includes nodes which represent HTML addresses and branches which represent links from an html address of one node to an HTML address of another node. Preferably, the core data structure is of a type described in U.S. patent application Ser. No. 09/801,076, filed Mar. 6, 2001, and entitled "Method and Apparatus for Organizing Data by Overlaying a Searchable Database with a Directory Tree Structure", which is hereby incorporated by reference.

Each node within the directory tree structure is considered a discrete category. The nodes are collections of related data and branches are links between nodes. As used herein, the term data preferably refers to web-based multimedia that includes sound, video, graphics, and appropriately formatted text. Appropriately formatted text can include, but is not limited to, word documents, excel documents, powerpoint documents, mechanical drawings, and any document or file rendered by a personal computer or a workstation. It should be clear to one skilled in the art that data can also include discrete appropriately formatted and independently accessible data items, files, and applications with associated URLs and web interface stored in human resource databases, financial and accounting databases, manufacturing databases, order processing and fulfillment databases, customer service databases, sales and marketing databases, and other similar databases or data file formats.

Preferably, the top of the directory tree structure includes nodes of the most general type of information, whereas the bottom of the directory tree structure includes nodes of the most specific type of information. As a user moves down the directory tree structure, the nodes at a next lower level will include more specific information than the nodes of the previous higher level. The converse is also true, as a user moves up the directory tree structure, the nodes at the next higher level will include more general information than the nodes on the previous lower level. As new information is located by the harvesting system, the new information is assigned to one or more nodes, as will be described in detail below. Nodes are also preferably cross-linked to related topics which enables users to navigate laterally within the directory tree structure.

The harvesting system of the present invention utilizes the directory tree structure to manage and access data within a searchable database. The related data is not physically formatted within the directory tree structure. Instead, each data item is accessible though appropriately formatted addresses including Uniform Resource Identifiers (URIs) and Uniform Resource Locators (URLs). Each node includes associated pointers, where each pointer acts as a link, or points, from a specific node to a URL corresponding to a discrete data item within the searchable database. In this manner, the directory tree structure accesses the discrete data item by utilizing the pointer that links the specific node to the URL corresponding to the discrete data item. Defining the pointers is part of the directory tree structure construction process. Though such a construct, the directory tree structure essentially overlays the searchable database and groups related data items via the pointers. Each discrete node is a collection of pointers to the related data items.

Higher level systems are built around the core data structure. These higher level systems use abstractions to access the data referred to by the core data structure. Such higher level systems include a topics database, a decision tree, and a keyword search. The topics database provides an index into the core data structure using a relative set of tables. The keyword search retrieves related data into a simple index. Using the topics database or the keyword search, data can be sorted by alphanumeric, keyword or phonetic. The decision tree includes a dichotomous key or a multi-nodal search methodology. Higher level systems can be used as stand-alone applications or can be used as a navigation mechanism for the core data structure.

Figure 1:
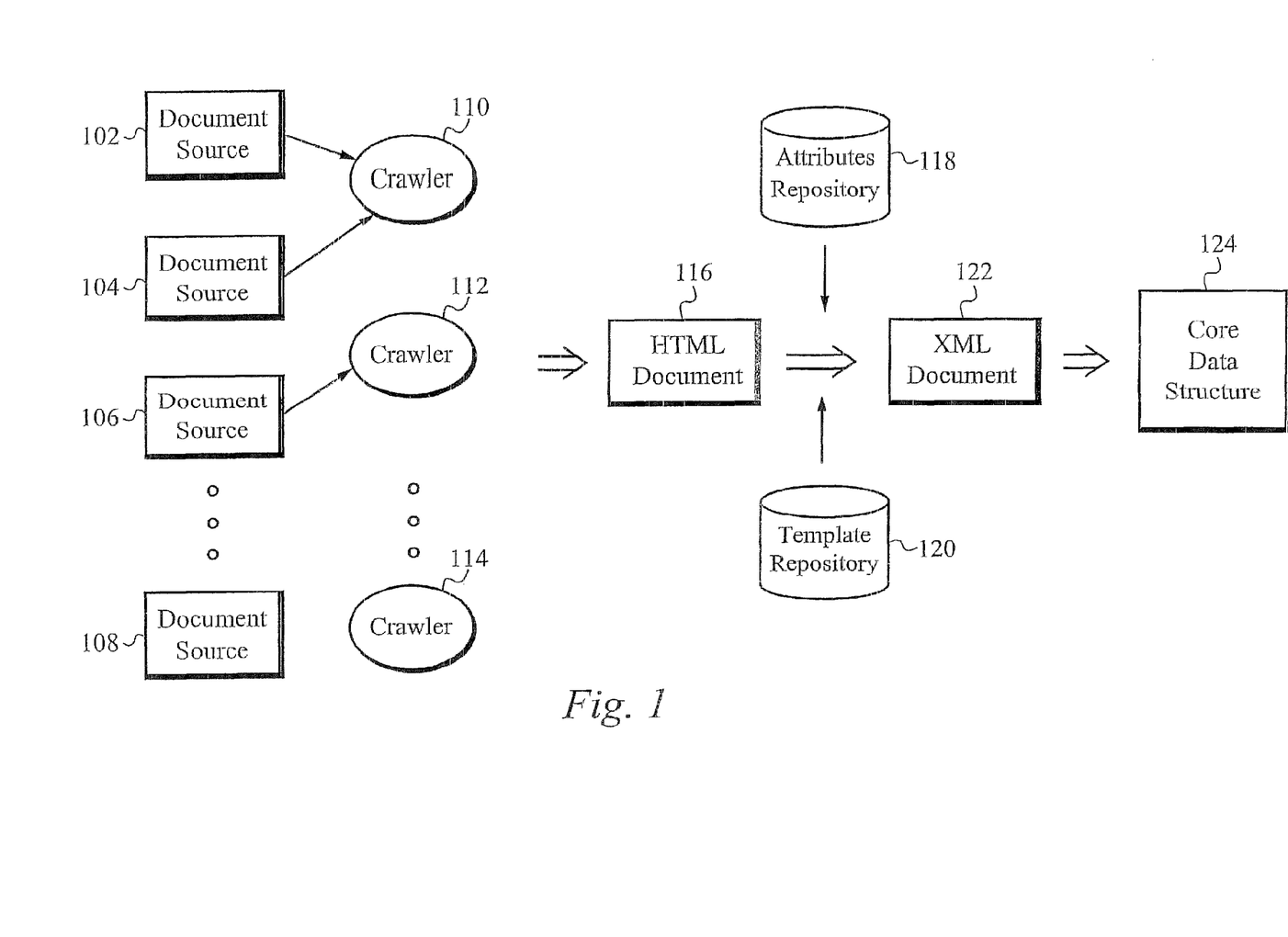
FIG. 1 illustrates a conceptual diagram of the harvesting system of the present invention.

FIG. 1 illustrates a conceptual diagram of the harvesting system of the present invention. A set of crawlers 110, 112, 114 search document sources 102, 104, 106, 108 for relevant data, hereby referred to as located data. Each located data item is converted to an HTML document 116. The harvesting system uses an attributes repository 118 and/or a template repository 120 via either a first process, a second process, or a combination thereof as described in detail below, to convert the HTML document 116 to an XML document 122, and to associate the converted XML document 122 to one or more relevant nodes within a core data structure 124. The XML document 122 is preferably placed in a queue so that the determined associations between the core data structure 124 and the XML document 122 can be reviewed prior to actually linking the two. Alternately, the XML document and the relevant nodes within the core data structure are automatically linked according to the determined associations.

The first process used by the harvester system of the present invention includes locating data to harvest, analyzing data into categories, parsing data for parameters, and queuing data for loading into the core data structure. Each of these process steps is described in detail below.

The process of locating data to harvest includes defining the scope of data to locate, storing a file path for each new file, locating only new and changed data, and inactivating files no longer available or stored. To define the scope of data to locate, a user preferably specifies the location or directory from where the data is to be retrieved. This definition can be a high-level directory path, or can be very specific to subdirectories or to file types or extensions. A scope structure is a list of path statements defined by the user and stored within the harvesting system. Following is an exemplary sample list:

/dir/dir/file.ext
/dir/flle.*
/dir/dir2/*

The syntax is similar to that used in operating systems to specifically list files within a file system. The * character means any and all characters. In the above example, /dir/dir2/* indicates the selection of all files in directory "/dis" in sub-directory "dir2". A remote file system can also be selected using an internet URL syntax:
    Protocol:/dir/*
Some examples of protocols available are HTTP, FTP, etc, In this manner, file systems on systems across a network can be scanned and the harvesting system of the present invention can be loaded with information related to these remote systems.

To store the file path of each new located file, each individual file scanned and selected is recorded within a database of the harvesting system. The database can be included within the core data structure, or can be a database separate from tile core data structure. Additional statistics can also be recorded, such as the file size and the date the file was last updated. This information is available on operating system directory structures, or by remote protocols such as HTTP and FTP.

To locate only new and changed data, the harvesting system utilizes the statistics for each recorded file and path. The harvesting system can determine whether the file is new or updated during each directory scan, by using a last modified statistic, for example. The harvesting system can be directed to only consider and load new or updated files since the file system was last scanned. The harvesting system can also check whether a file has been removed from the file system, and if so, can remove the entry from the harvesting system database. This process synchronizes the harvesting system database with the local or remote file system.

Remote files or file systems that are not available or reachable over the network can be flagged as inactive in the harvesting system database. This prevents end users from trying to access dead or inactive links to remote file systems that are unavailable. The harvesting system can be configured to try multiple times, and after a period of unsuccessful tries, delete the file paths from the scope structure completely.

Once data appropriate to harvest is located, the data is analyzed into categories. In this phase, the harvesting system scans the data and the data attributes and attempts to select the exact directory node or category within the core data structure to catalog the data. Once a directory node is selected, the data is added as a link into this directory node. The actual process of linking a particular data item to a particular node is performed in a subsequent step, as will be explained in detail below. The data can be valid for more than one node of the core data structure, and therefore can be added to multiple nodes.

Each node of the core data structure includes a set of rules that are used to specify whether the data belongs to that node. Each leaf of the directory tree structure will have further and more specific rules that can further specify whether the data belongs to that node. This process of checking a document data against a node continues down the directory tree structure to the lowest branch where the rules remains valid.

The rules for each node match a data item, or document, by using at least one or more of the following criteria:
    1. Directory name or path
    2. Document type or file extension
    3 Document Title or a sub-string thereof
    4. Positional Attributes embedded within the document
    5. Text Patterns embedded within the document
    6 Key Phases embedded within the document
    7. Concepts embedded within the document. This is similar to Key Phrases but would be cross-referenced with a Concept dictionary. This maps more general concept rules to specific phases within the document.
    8. Meta-Data embedded within the document
    9. A Boolean combination of ally of the above An example of this type of pegging process might be to analyze and categorize electronic copies of invoices. In this example, a path to a document is /dir/companya/invoices/*". This directory can be associated with a rule in the directory node "Invoices" and therefore the document is associated with the node "Invoices." The node "Invoices" can branch into one or more related nodes, one of which might include a rule that looks for embedded key words. For example, "Date"="July ?, 2001" can be a rule for a July, 2001 directory node and if the document includes a date for July of 2001, the 11 the document belongs in this directory branch. To continue the example, the node "July, 2001" can branch into one or more related nodes based on a customer name. One of these "customer" nodes might include an embedded keyword rule of "Customer Name"=>"A" and <"C"*. In this case, the invoice would belong in the directory node of "Customers A though B." In the above example, a document is discovered in the Invoices directory of the core data structure. The harvesting system cascades down the directory tree branches until the document is specifically categorized into the category:
    Invoices→July 2001→Customers A through B.
This process can be extremely detailed and specific. This process is applied to the entire directory tree of the core data structure so that the document is associated with all relevant nodes. In this manner, the document can also belong to another directory node, such as:
    Invoices→Past Due→July 2001.
In this case, the harvesting system places a link to the document in both directory nodes. This allows the user to locate the document using different selection criteria or allows the harvesting system administrator to organize and categorize the document in multiple valid categories.

Once appropriate categories are determined for the data, the data further analyzed for parameters. Parameters can be used a link or for refining selection criteria for a user trying to locate data. Each parameter defines an attribute and the associated value of the attribute determines an attribute-value pair. Parameter rules are defined and are attached to a particular node within the directory tree. The parameter rules can be categorized as parse logic, embedded keywords, or embedded keywords mapped to concept rules.

Parse logic is well known the art and can take several forms. A specific example is a discovery/expect rule. An example of a discovery/expect rule is to first scan a document for a keyword. After the keyword is discovered, the parse logic expects a value to follow the keyword within the document. If, for example, the document contains the keyword "Tire Size:", then the parser looks for a reasonable tire size value to immediately follow this phase.

Embedded keywords are simple keywords found within the document. If the harvesting system finds a keyword and the corresponding directory node includes a keyword rule like:

parameter "State"="California", the harvesting system sets the parameter value of "State" to be equal to "California". When the document is eventually added to the core data structure, the parameter of "State" would be "California."

Embedded keywords mapped to concept rules are similar to embedded keywords, but include the use of a concept cross-reference dictionary. In this case, a parameter "City" with a determined parameter value "NYC" can be interpreted as a parameter of "City"="New York".

Once the located data is identified within the scope defined, targeted as new or updated data, analyzed and pegged to a directory(s), and given values for data parameters, the data is the ready to be added to the core data structure. As described above, the actual data is not retrieved and stored within the core data structure, but instead, a reference, or pointer is added within the core data structure which refers to a location, or address of the actual data. As such, the concept of adding the data to the core data structure preferably refers to adding a reference to the actual data within the core data structure. Although it is preferred that the data is added to the core data structure by way of a reference, it should be clear to those skilled in the art that the data can alternatively be added to the core data structure by retrieving and storing the data within a database, either local or remote, coupled to the core data structure. In this alternate embodiment, a storage medium capable of storing all, or a portion of, the data referenced by the core data structure. Any conventional storage medium can be used.

To add the data to the core data structure, the harvesting system can be configured in at least two different ways. First, the harvesting system and the core data structure are configured to trust the results provided by the harvesting system and to automatically add the data directly to the core data structure. Second, the harvesting system and the core data structure are configured to place the new data into a queue to be manually reviewed by an administrator. Each node of the directory can have a different administrator or multiple administrators. The administrator then has the option to add the entry to the core data structure as-is, to edit the contents and parameters, move the entry to a more valid directory location, or reject the transaction completely. Preferably the second process of adding data to the core data structure is used. Invalid or irrelevant data is common with chaotic data sources and having a human review the selections is usually wise. In some cases however, such as the invoice example above, where data is obtained from a well known source and includes a well known format, 100% accuracy by the harvesting system is possible.

Figure 2:
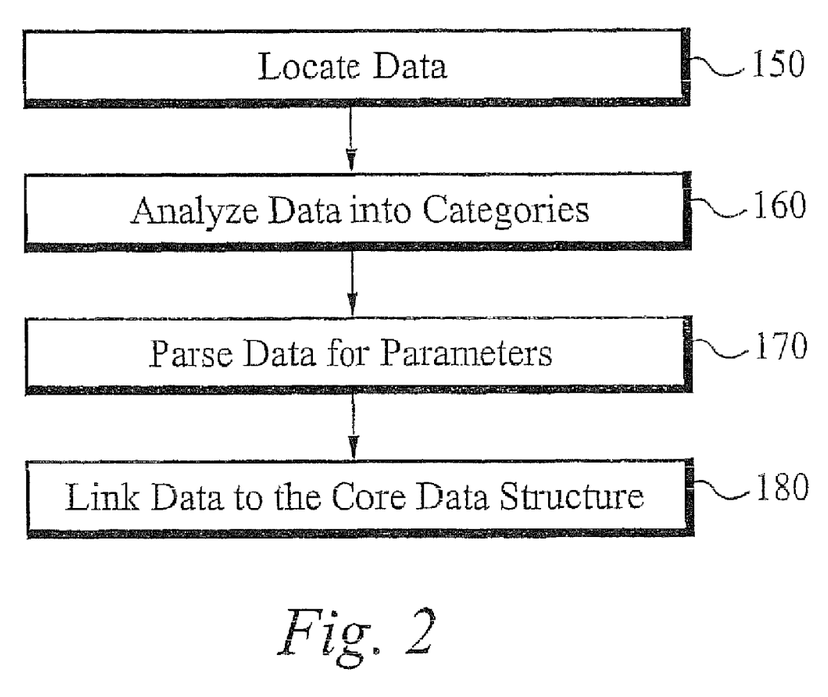
FIG. 2 illustrates the first process used by the harvester system of the present invention.

The first process is summarily illustrated in FIG. 2. At the step 150, appropriate data is located. At the step 160, the located data is analyzed and placed into one or more categories based on the analysis. At the step 170, the data is parsed to determine and then define applicable parameters and each parameter's corresponding value. At the step 180, the data is appropriately linked to the core data structure.

When document data follows a fairly predictable format, a set of rules can be specified that allows the document data to be scanned and analyzed by the harvester system. This allows the harvesting system to map and add data to the core data structure with less labor and less error than a human editor or administrator. This capability also maintains higher data concurrence and accuracy than possible with a manual process.

The second and preferred process used by the harvesting system includes locating data to harvest and attempting to categorize the located data by matching a format of the located data to one of a plurality of predefined templates, each template defining a well known format. If a match is made, the located data is associated to one or more specific nodes within the core data structure based on rules defined in the matching template. The located data is then parsed for parameters based on the well known format defined in the matching template.

If, however, no match is made between the located data format and one of the templates, then the located data is parsed for parameters based on a search for known parameter attributes. The harvesting system includes an attributes repository which is a compilation of all attributes defined within the core data structure. As each attribute is found within the located data, a value for each discovered attribute is determined, preferably using the discovery/expect rule described above. In this manner, a list of attribute-value pairs associated with the located data is formed. It should be clear to those skilled in the art that other conventional methods of determining attribute-value pairs from within the located data can be used. The located data is then associated to one or more nodes within the core data structure by cascading down the directory structure and comparing the list of attribute-value pairs associated with the located data to rules associated with each node. Located data that matches criteria defined by the rules of a particular node is associated with that node.

The second process preferably populates the core data structure with data obtained from well known data sources. A known data source includes some type of decipherable format, structured or unstructured, that is from a known origin. Examples of data obtained from a known data source includes, but is not limited to, a resume, a memo, a power-point presentation, an invoice, and a word document. Alternatively, data can be obtained from pseudo-chaotic data sources in which a format of the data is less known. Data can be of any known file type, for example powerpoint (.ppt), word (.doc), and excel (.xls). Each data source can include one or more different file types.

A set of crawlers is used to locate new documents and indexing information based on search criteria. Preferably, each crawler is multi-threaded and multi-processing. The crawlers cascade though file systems, web sites and in general any accessible data source, searching for data, as is well known in the art. One such search criteria is a keyword mechanism similar to a search engine. Once the information, or data, is located it is categorized, parameterized and linked to the core data structure, preferably in a manner which minimizes complexity for the system.

Once located by the crawlers, each located data is converted to an HTML document. HTML is preferred because it is well known, and works well with graphics and text. There are well known techniques for converting documents to HTML. An advantage to converting all located data to HTML documents is to provide a consistent source, in this case HTML.

The harvesting system includes a template repository comprising a set of templates. Each template includes rules related to a specific document template-type. Exemplary template types include a resume template, a memo template, a power-point template, or an invoice template. There can be multiple sub-types for each template-type. For example, the invoice template can be sub-divided into an invoice template based on a Quicken™ document or an Excel™ spreadsheet. Sub-types are important as each sub-type defines a specific format. Templates define formats for data from well known sources. Well known data sources follow well known patterns by which information is formatted within a document. Each template preferably include rules that define the parameters associated with a particular template type and a means for determining a value for each parameter, as in an attribute-value pair. For example, a rule can define a parameter, such as a customer number, and where the parameter should be located within the document, such as the second field of the second line, or how the parameter can be found, such as using a search mechanism to find "customer number". By matching the converted HTML document to a specific template, the rules associated with the matched template can be used to determine specific attribute-value pairs of the HTML document. In other words, the HTML document is scanned to populate anticipated attribute-value pairs based on rules defined within the matched template.

Matching the HTML document to a specific template can be accomplished using a variety of methods. A first method includes determining the file type of the original located data, such as .ppt, .xls, or .doc, and then matching format of the HTML document to the formats defined by all templates associated with the determined file type. A second method includes using the analysis process defined by the first process of the present invention to associate the HTML document to one or more nodes within the core data structure. Each node can be associated with one or more templates, whereby a list of templates that possibly match the HTML document is produced. A format of the HTML documents matched to the formats defined by this list of templates. The analysis process defined by the second process can also include rules which match the HTML document to a particular template by criteria other than the format, such as for example a pattern matching algorithm used by an artificial intelligence (AI) system, a Bayesian algorithm and using statistical pattern matches.

The HTML document is then converted to an XML document using XML tagging. Each attribute-value pair associated with the HTML document is used as an XML tag. In this manner, the XML format enables a mechanism to parse out parameters associated with the original data document.

Once the XML document is generated, the XML document is matched to the core data structure. As previously described, each node within the core data structure includes a set of rules. These rules are preferably applied using a logic train. For example, a node can include a rule that states if a document includes attribute A, attribute B, and attribute C, then the document is associated, or linked, to this node. Other rules can stipulate that if a defined percentage of attributes match, then a link is justified. Each XML document is associated to specific nodes by cascading down the directory tree structure and applying the rules at each node to the XML tags of the XML document. A single XML document can be associated to any number of nodes.

Each XML document is preferably stored as an object within an object database. Each object includes the XML document and a file path of the original located data associated with the XML document.

The process of associating a document to a node is dynamic. If the source of the document changes to another location, or if the document is deleted, a crawler ascertains that the original file path of the document is no longer valid. In this case, the object associated with the XML document is deleted from the object database and each link associating the original data document to particular nodes in the core data structure is deleted from the core data structure. If the document is subsequently located by a crawler at a different data source, then the aforementioned second process is repeated incorporating the file path of the different data source.

Each object also includes a last modified field, which can be used to determine if a data document has been updated. Rules determine how frequently the crawlers scan the data sources. When a crawler locates a data document that matches a file path of an existing object in the object database, the crawler can determine whether the located data document has been updated by comparing the last modified field of the located data to the last modified field of the corresponding object in the object database. If the located data document has been updated, then the second process is repeated to determine if the current links to the core data structure remain valid. Preferably, when it is determined that the located data document has been updated, then all existing links are deleted, new attribute-value pairs are determined as above, and new links are established between the updated data document and the core data structure.

Not all HTML-converted documents match a specific template from the template repository. In this case, the located data associated with the HTML document typically originates from a lesser known data source. When the HTML document does not match a known pattern, that is one of the templates, then the harvesting system proceeds with determining attribute-value pairs associated with the HTML document. This method is less exact and less efficient than the process of determining anticipated attribute-value pairs using one of the templates, as explained in detail above. Preferably, the HTML document is searched for attributes which match those stored in the attributes repository. When an attribute is found within the HTML document, value for the discovered attribute is determined, preferably using the discovery/expect rule discussed above, thereby forming an attribute-value pair associated with the HTML document. The entire HTML document is searched to form a list of attribute-value pairs. An XML document is then generated using each attribute-value pair from the list as an XML tag.

The XML document is then matched to the core data structure in a manner similar to that described above. When matching an XML document to the core data structure, occasionally 100% of the attributes associated with a particular node within the core data structure match within a given XML document. Most likely, a portion of the number of attributes associated with the node are found within any given XML document. Preferably, each node includes a rule that defines an acceptable threshold, for example if 70% of the attributes defined by a specific node are found within a particular XML document, then that XML document is associated with that node.

Preferably, an XML document that is determined to be associated with a particular node is placed in a queue such that an administrator can verify whether or not the located data associated with the XML document is linked to the particular node. This verification step further improves the placement accuracy of the harvesting system. The verification step also provides the administrator an opportunity to redefine rules to better match located data to the particular node.

Figure 3:
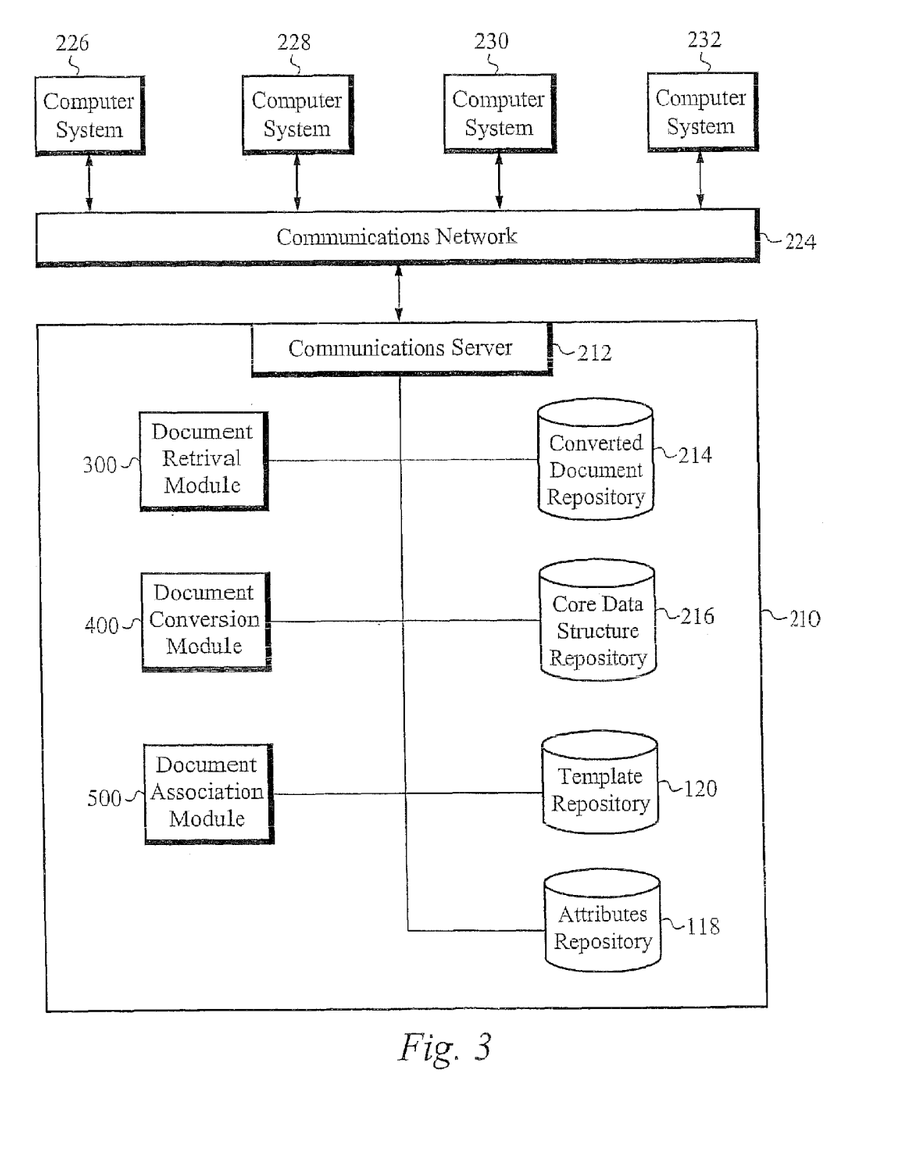
FIG. 3 illustrates a block diagram of the harvesting system according to the preferred embodiment of the present invention.

A block diagram of the harvesting system according to the preferred embodiment of the present invention is illustrated in FIG. 3. A controller 210 includes a communications server 212, a document retrieval module 300, a document conversion module 400, a document association module 500, a converted document repository 214, a core data structure repository 216, the template repository 120 and the attributes repository 118. The document retrieval module 300 is coupled to the communications server 212 to provide access and communications between the controller 210 and remote document sources. The document retrieval module 300 performs the process of locating relevant data to be associated with the core data structure. The core data structure, along with the higher level structures built around the core data structure, are stored within the core structure repository 216. The attributes repository 118 stores the complication of all attributes defined within the core data structure. The template repository 120 stores the set of templates, where each template includes rules related to a specific template-type. The document conversion module 400 converts the located data to an HTML document, and also converts the HTML document to an XML document using the template repository 120 and/or the attributes repository 118 via the first process, the second process, or a combination thereof, as described above. The converted HTML document and the converted XML document are stored within the converted document repository 214. The converted document repository 214 is preferably an objects database, where the HTML document and the XML document are each stored as objects within the objects database. The document association module 500 associates each XML document to one or more relevant nodes within the core data structure, thereby linking each relevant node to the located data associated with the XML document.

The controller 210 is coupled to the public switched telephone network 224 to allow communications between the communications server 212 and the computer systems 226-232. Each computer system 226-232 includes one or more document sources 102-108 (FIG. 1). Preferably, this connection is established between the computer systems 226-232 and the controller 210 over the internet through the public switched telephone network 224. Alternatively, this connection is established by any appropriate connection including a direct connection over the public switched telephone network 224 or over a dedicated intranet network.

Figure 4:
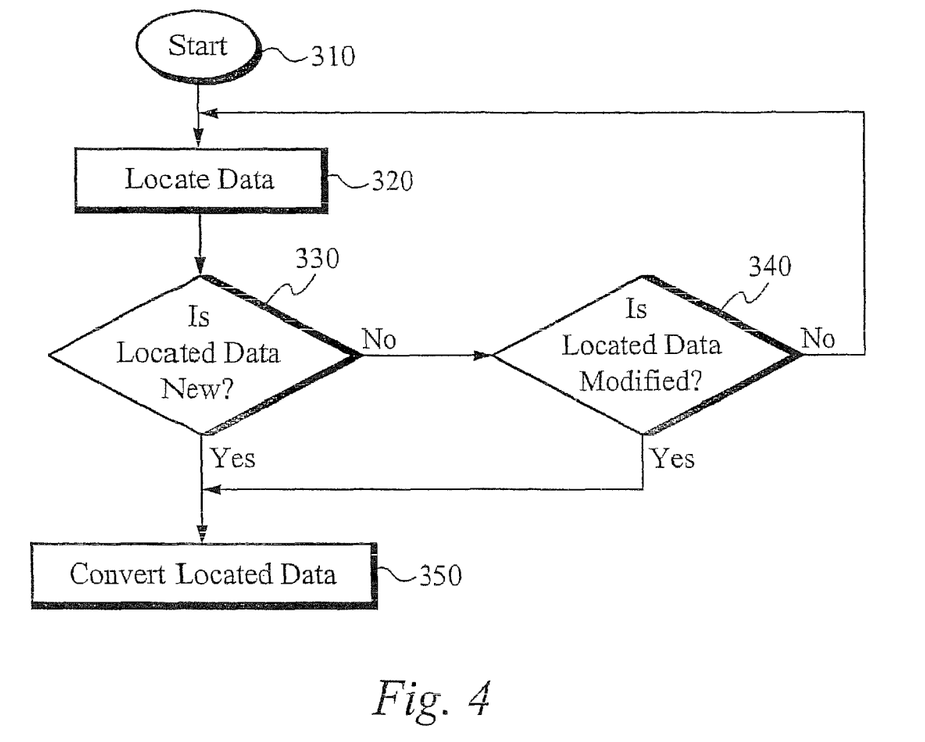
FIG. 4 illustrates a document retrieval process used by the document retrieval module of FIG. 3.

FIG. 4 illustrates a document retrieval process used by the document retrieval module 300 (FIG. 3). The document retrieval process starts at the step 310. At step 320, a data document is located. At the step 330, it is determined if the located data is a new data document. The preferred process by which it is determined if the located data is a new data document is to compare the file path of the located data to the file path of each data object stored within the converted document repository 214 (FIG. 3). If the file path of the located data matches a file path of an existing data object, then the located data is not a new data document. If it is determined that the located data is not a new data document at the step 330, then at the step 340 it is determined if the located data has been modified. The preferred process by which it is determined if the located data has been modified is to compare a last modified field of the located data to the last modified field of the matching data object determined at the step 330. If it is determined at the step 340 that the located data has not been modified, then the document retrieval process jumps back to the step 320 to locate another data document. If it is determined at the step 340 that the located data has been modified, or if it is determined at the step 330 that the located data is new, then at the step 350 the located data is converted using the document conversion module 400 (FIG. 3).

Figure 5:
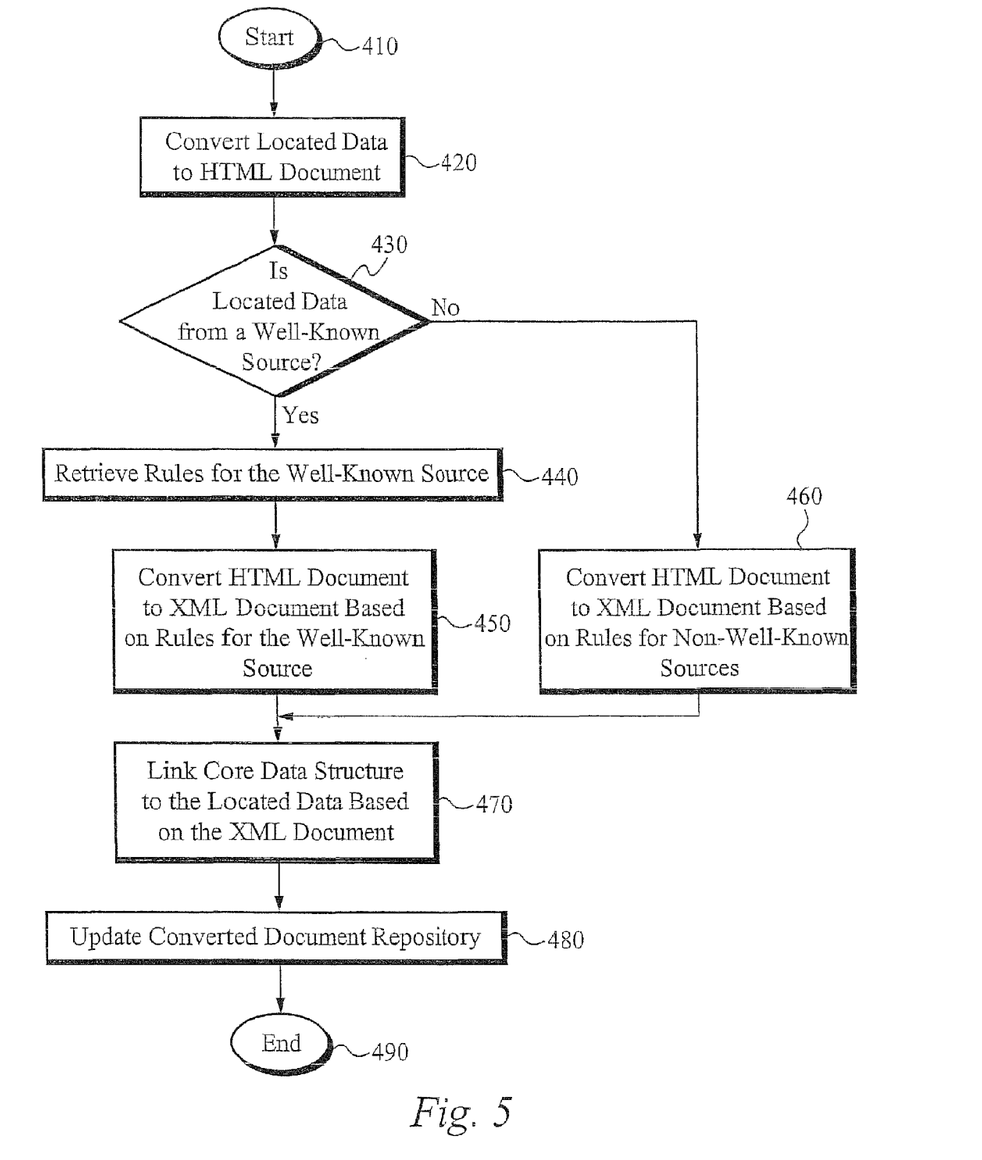
FIG. 5 illustrates a conversion and linking process used by the document conversion module of FIG. 3.

FIG. 5 illustrates a conversion and linking process used by the document conversion module 400. The conversion and linking process converts located data to an XML document and links the core data structure to the located data using the XML document. The conversion and linking process starts at the step 410. At the step 420, located data is converted to an HTML document. At the step 430, it is determined if the located data is from a well-known source. The preferred process by which it is determined if the located data is from a well-known source is to determine if the HTML document matches one of the templates from the template repository. If the HTML document matches a template, then the located data is determined to have originated from a well-known source. If it is determined that the located data is from a well-known source at the step 430, then at the step 440 the rules associated with the well-known source are retrieved. These rules are preferably stored within the matched template.

At the step 450, the HTML document is converted to an XML document according to the rules defined within the matched template. Preferably, the HTML document is categorized according to the directory tree structure of the core data structure, and parsed for parameters to determine attribute-value pairs associated with the located data. Categorizing and parameterizing are performed according to the first process, the second process, or a combination thereof as described in detail above. Relevant meta-data, including each determined attribute-value pair, is incorporated into the XML document using XML tagging, as is well known in the art.

If it is determined at the step 430 that the located data is not from a well-known source, then at the step 460 the HTML document is converted to an EML document according to the rules defined for non-well-known sources. The rules for non-well-known sources preferably direct the harvesting system to parse the located data for parameters. Attribute-value pairs are determined by matching the HTML document to the attributes repository, as described in detail above. Relevant meta-data, including each determined attribute-value pair, is incorporated into the XML document using XML tagging, as is well known in the art.

At the step 470, the core data structure is linked to the located data using the document association module 500. The core data structure linked to the located data based on the converted XML document. As previously described, each template defines rules which associate the template to one or more nodes within the core data structure. An XML document generated using a matching template, at the step 450, is thereby associated to the one or more nodes defined by the rules of the matched template. In this manner, an XML document associated to located data from a well-known source is associated to one or more nodes of the core data structure. An XML document generated using the rules defined for well-known sources, at the step 460, is associated with the core data structure by cascading down the directory tree structure and matching the XML document to the rules for each node, as previously described. Each node that matches the XML document in this manner establishes an association between the node and the located data associated with the XML document. The XML document is preferably placed in a queue so that the determined associations between the core data structure and the XML document can be reviewed prior to actually linking the two. Alternately, the XML document and the relevant nodes within the core data structure are automatically linked according to the determined associations. Further, the XML document generated using a matching template can be further associated to additional nodes by cascading down the directory tree structure and matching the XML documents to the rules for each node.

At the step 480, the converted document repository is updated. If the located data is a new data document, then the HTML document and the XML document are preferably saved as new entries. Each entry also includes the associations between the located data and the core data structure. If the located data is a modified data document, then the HTML document and the XML document replace the existing HTML document and the existing XML document. The conversion and linking process ends at the step 490.

The harvesting system of the present invention links a core data structure to relevant data documents. A plurality of crawlers searches a plurality of document sources to locate data. Each located data document is converted to an HTML document. The HTML document is converted to an XML document which includes XML tags to define, amongst other things, attribute-value pairs associated with the located data. The harvesting system uses a templates repository and an attributes repository to aid in the conversion of the HTML document to the XML document. The attributes repository is a compilation of all attributes defined by the core data structure. Each template within the templates repository defines a known format, anticipated attributes, and rules for associating any located data which is of a type that matches the template to specific nodes within the core data structure. If the HTML document matches a template in the template repository, attribute-value pairs are determined according to the anticipated attributes, and associates are made which link the located data to specific nodes within the core data structure. In addition to, or instead of, using a matching template, a list of attribute-value pairs is generated for the HTML document by searching the HTML document for an attributes stored within the attributes repository. Further associations can be made by cascading down the directory tree structure of the core data structure and matching the XML document, which includes all attribute-value pairs for the corresponding located data, to relevant nodes within the core data structure. Each XML document, and the corresponding associations with the core data structure, are preferably stored as data objects within ail objects database. New objects can continually be added to the database, obsolete objects can be deleted, and modified objects can be changed.

Although the preferred harvesting system of the present invention is described above in relation to locating, categorizing, and parameterizing data from a well-known source or a novel-known source including a recognizable format, the harvesting system can be used to locate, categorize, and parameterize data from an un-structured source, such as free form text.

The present invention has been described in terms of specific embodiments incorporating details to facilitate the understanding of principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to those skilled in the art that while the preferred embodiment of the present invention is accessible over the internet through the public switched telephone network, the present invention could also be accessible on any other appropriate communication structures both wired and wireless, including cable, intranets, direct connections and the like.

What is claimed:

1. A method of linking data to a searchable database, the searchable database in a directory tree structure having nodes and branches, each node representing a category and each branch representing a relationship between nodes, wherein each node comprises rules for associating data with the node, the method comprising:
   locating a first document to link to the searchable database;
   parsing data in the first document to identify, from a plurality of attributes that are definable in the searchable database, a subset of the plurality of attributes associated with the data in the first document;
   parsing the data in the first document to obtain a value for each of the one or more attributes;
   generating a second document associated with the first document, the second document comprising one or more tags, wherein each of the one or more tags comprises one of the one or more attributes and the parsed value for the one of the one or more attributes;
   storing an object in an objects database, the object comprising the second document and a link to the first document;
   determining, based on the number of attributes in the subset, that the second document satisfies the rules for associating the first document with a specific node in the searchable database; and
   associating a pointer to the first document with the specific node, the pointer comprising a link based on the link in the stored object.

2. The method of claim 1, further comprising:
   queuing the first document to be reviewed manually before determining the specific node.

3. The method of claim 1, wherein generating the second document and determining the specific node are performed automatically.

4. The method of claim 1, further comprising:
   determining that the first document is new to the searchable database before generating the second document.

5. The method of claim 1, wherein the determining comprises:
   determining that a predetermined number of the plurality of attributes associated with the specific node are defined by the one or more tags within the second document.

6. The method of claim 1, further comprising:
   determining that the first document has been modified; and
   modifying the object in the objects database corresponding to modifications to the first document.

7. The method of claim 1, wherein locating the first document comprises locating the first document on a network.

8. The method of claim 7, further comprising:
   determining that the first document is no longer accessible on the network; and
   deleting, from the objects database, the object corresponding to the first document.

9. The method of claim 1, further comprising:
   determining a plurality of nodes which are below the specific node in the directory tree structure;
   determining that the one or more tags in the document satisfy the rules for associating data with at least one of the plurality of nodes; and
   associating a pointer to the first document with the at least one of the plurality of nodes, the pointer comprising a link based on the link in the stored object.

10. A system for linking data to a searchable database, the searchable database in a directory tree structure having nodes and branches, the nodes representing a category and the branches representing relationships between the categories, wherein each node comprises rules for associating data with the node, the system comprising:
   a communication mechanism configured to access a network;
   an objects database; and
   a controller, wherein the controller is configured to:
      locate, on the network, a first document to link to the searchable database;
      parse data in the first document to identify, from a plurality of attributes that are definable in the searchable database, a subset of the plurality of attributes associated with the data in the first document;

parse the data in the first document to obtain a value for each of the one or more attributes;

generate a second document associated with the first document, the second document comprising one or more tags, wherein each of the one or more tags comprises one of the one or more attributes and the parsed value for the one of the one or more attributes;

store an object in the objects database, the object comprising the second document and a link to the first document;

determine, based on the number of attributes in the subset, that the second document satisfies the rules for associating the first document with a specific node in the searchable database; and associate a pointer to the first document with the specific node, the pointer comprising a link based on the link in the stored object.

11. The system of claim 10, wherein the controller is further configured to:

queue the first document to be reviewed manually before determining the specific node.

12. The system of claim 10, wherein the controller is further configured to:

determine that the first document is new to the searchable database before generating the document.

13. The system of claim 10, wherein the controller is further configured to determine the specific node by determining that a predetermined number of the plurality of attributes associated with the specific node are defined by the one or more tags within the second document.

14. The system of claim 10, wherein the controller is further configured to:

determine that the first document has been modified; and modify the object in the objects database corresponding to modifications to the first document.

15. The system of claim 10, wherein the controller is further configured to:

determine that the first document is no longer accessible on the network; and delete, from the objects database, the object corresponding to the first document.

16. The system of claim 10, wherein the controller is further configured to:

determine a plurality of nodes which are below the specific node in the directory tree structure;

determine that the one or more tags in the document satisfy the rules for associating data with at least one of the plurality of nodes; and associate a pointer to the first document with the at least one of the plurality of nodes, the pointer comprising a link based on the link in the stored object.

17. A system for linking data to a searchable database, the searchable database in a directory tree structure having nodes and branches, the nodes representing a category and the branches representing relationships between the categories, wherein each node comprises rules for associating data with the node, the method comprising:

means for locating a first document to link to the searchable database;

means for parsing data in the first document to identify, from a plurality of attributes that are definable in the searchable database, a subset of the plurality of, attributes associated with the data in the first document;

means for parsing the data in the first document to obtain a value for each of the one or more attributes;

means for generating a second document associated with the first document, the second document comprising one or more tags, wherein each of the one or more tags comprises one of the one or more attributes and the parsed value for the one of the one or more attributes;

means for storing an object in an objects database, the object comprising the second document and a link to the first document;

means for determining, based on the number of attributes in the subset, that the second document satisfies the rules for associating the first document with a specific node in the searchable database; and means for associating a pointer to the first document with the specific node, the pointer comprising a link based on the link in the stored object.

18. The system of claim 17, further comprising:

means for queuing the first document to be reviewed manually before determining the specific node.

19. The system of claim 17, wherein the means for generating the second document and means for determining the specific node are configured to perform automatically.

20. The system of claim 17, further comprising:

means for determining that the first document is new to the searchable database before generating the second document.

21. The system of claim 17, wherein the determining comprises:

means for determining that a predetermined number of the plurality of attributes associated with the specific node are defined by the one or more tags within the second document.

22. The system of claim 17, further comprising:

means for determining that the first document has been modified; and means for modifying the object in the objects database corresponding to modifications to the first document.

23. The system of claim 17, wherein the means for locating the first document is a means for locating the first document on a network.

24. The system of claim 23, further comprising:

means for determining that the first document is no longer accessible on the network; and means for deleting, from the objects database, the object corresponding to the first document.

25. The system of claim 17, further comprising:

means for determining a plurality of nodes which are below the specific node in the directory tree structure;

means for determining that the one or more tags in the document satisfy the rules for associating data with at least one of the plurality of nodes; and means for associating a pointer to the first document with the at least one of the plurality of nodes, the pointer comprising a link based on the link in the stored object.

* * * * *

UNITED STATES PATENT AND TRADEMARK OFFICE
CERTIFICATE OF CORRECTION

PATENT NO. : 8,335,779 B2
APPLICATION NO. : 13/103762
DATED : December 18, 2012
INVENTOR(S) : Keith, Jr.

It is certified that error appears in the above-identified patent and that said Letters Patent is hereby corrected as shown below:

On the Title Page, in item (57), under "ABSTRACT", in Column 2, Line 1, delete "form" and insert -- from --, therefor.

Title Page 3, in item (56), under "OTHER PUBLICATIONS", in Column 1, Line 5, delete "submit.hml," and insert -- submit.html, --, therefor.

Title Page 3, in item (56), under "OTHER PUBLICATIONS", in Column 1, Line 21, delete "Parametrizable" and insert -- Parameterizable --, therefor.

Title Page 3, in item (56), under "OTHER PUBLICATIONS", in Column 2, Line 4, delete "Engineering":" and insert -- Engineering," --, therefor.

In the Specifications:

In Column 6, Line 17, delete "though" and insert -- through --, therefor.

In Column 6, Line 26, delete "Though" and insert -- Through --, therefor.

In Column 8, Line 7, delete "path" and insert -- path. --, therefor.

In Column 8, Line 8, delete "extension" and insert -- extension. --, therefor.

In Column 8, Line 9, delete "thereof" and insert -- thereof. --, therefor.

In Column 8, Line 10, delete "document" and insert -- document. --, therefor.

In Column 8, Line 11, delete "document" and insert -- document. --, therefor.

In Column 8, Line 12, delete "document" and insert -- document. --, therefor.

Signed and Sealed this
Fourth Day of June, 2013

Teresa Stanek Rea
*Acting Director of the United States Patent and Trademark Office*

CERTIFICATE OF CORRECTION (continued)
U.S. Pat. No. 8,335,779 B2

In the Specifications:

In Column 8, Line 17, delete "document" and insert -- document. --, therefor.

In Column 8, Line 18, delete "above" and insert -- above. --, therefor.

In Column 8, Line 29, delete "11 the" and insert -- 11th --, therefor.

In Column 8, Line 33, delete "=>"A"" and insert -- => "A"* --, therefor.

In Column 8, Line 35, delete "though" and insert -- through --, therefor.

In Column 9, Line 44, delete "as-is," and insert -- as is, --, therefor.

In Column 10, Line 44, delete "though" and insert -- through --, therefor.

In Column 14, Line 19, delete "knownin" and insert -- known in --, therefor.

In Column 14, Line 22, delete "EML" and insert -- XML --, therefor.